(12) United States Patent
Zha et al.

(10) Patent No.: US 11,512,225 B2
(45) Date of Patent: Nov. 29, 2022

(54) PROCESS AND COMPOSITION FOR DUST CONTROL

(71) Applicant: Hexion Inc., Columbus, OH (US)

(72) Inventors: Charles Zha, Katy, TX (US); Jan Beetge, Pearland, TX (US)

(73) Assignee: HEXION INC., Columbus, OH (US)

( * ) Notice: Subject to any disclaimer, the term of this patent is extended or adjusted under 35 U.S.C. 154(b) by 414 days.

(21) Appl. No.: 16/183,572

(22) Filed: Nov. 7, 2018

(65) Prior Publication Data
US 2020/0140719 A1 May 7, 2020

(51) Int. Cl.
| | | |
|---|---|---|
| *C09D 197/00* | (2006.01) | |
| *C09K 3/22* | (2006.01) | |
| *E21F 5/02* | (2006.01) | |
| *E01C 21/00* | (2006.01) | |
| *C09K 17/32* | (2006.01) | |

(52) U.S. Cl.
CPC ............ *C09D 197/005* (2013.01); *C09K 3/22* (2013.01); *E21F 5/02* (2013.01); *C09K 17/32* (2013.01); *E01C 21/00* (2013.01)

(58) Field of Classification Search
None
See application file for complete search history.

(56) References Cited

U.S. PATENT DOCUMENTS

| | | | | | |
|---|---|---|---|---|---|
| 3,017,404 | A | * | 1/1962 | Ball ................... | D21C 11/0007 530/500 |
| 4,169,170 | A | * | 9/1979 | Doeksen .................. | C10L 9/10 106/277 |
| 4,551,261 | A | * | 11/1985 | Salihar ..................... | C09K 3/22 252/88.1 |

OTHER PUBLICATIONS

"Oxidative upgrade of lignin—recent routes reviewed" (2013). European Polymer Journal, vol. 49, pp. 1151-1173 (Year: 2013).*
Wood Products Industry (1995), retrieved from https://www3.epa.gov/ttn/chief/ap42/ch10/final/c10s02.pdf [cached in 2001] (Year: 1995).*
Gierer. "Chemical Aspects of Kraft Pulping". Wood Science Technology 14, pp. 241-266 (Year: 1980).*
Hintz. "Paper: Pulping and Bleaching" in Encyclopedia of Materials: Science and Technology [Editors: Buschow et al.], pp. 6707-6711 (Year: 2001).*

* cited by examiner

*Primary Examiner* — Jose I Hernandez-Kenney

(57) ABSTRACT

Compositions for dust suppression, methods for forming the compositions, and methods for using the compositions are provided. In one embodiment, the composition includes a non-sulfonated lignin and an alkylene glycol alkyl ether solvent. The compositions may be applied to an exposed surface of a substrate.

12 Claims, No Drawings

PROCESS AND COMPOSITION FOR DUST CONTROL

FIELD OF THE INVENTION

The present invention relates to compositions and methods for suppressing dust. In addition the present invention relates to the compositions and methods of applying the compositions.

BACKGROUND OF THE INVENTION

Particulate matter, often referred to simply as dust, is an EPA-regulated substance that is at times difficult to control in specific industrial processes such as mining, transportation, and stockpiles of raw materials. If particulate matter is not controlled well, hazards may be created such as toxic atmospheres, reduced visibility, dust explosions, and loss of life.

In the oil and gas industry, sand is widely used as a hydraulic fracturing proppant to hold the fractures after the fracturing pressure is released. Particulate matter is generated during sand mining, processing, storage, and transportation. Current methods for controlling particulate matter are applications of what is commercially known as a dust suppressant.

Conventional dust suppression systems include both mechanical and chemical methods. For instance, dust collection equipment includes devices which capture entrained dust, induce the dust to settle, or contain the dust. The most common dust suppression method, however, is the wetting of a substrate, such as coal, with water. Water is inexpensive and large quantities can be applied to eliminate dust. However, water's effectiveness as a dust suppressant has been observed to be less than satisfactory, especially in light of increasing regulation by environmental agencies.

Alternative dust suppressants include using binders such as bitumens, tars, and resinous adhesives. Resin coating is the only method that fits sand dust control due to the operations involved in hydraulic fracturing. Coatings used in fracturing sand are mainly polymeric resins, for example, polyacrylate, polyvinylacetate, and polyurethane. The use of these polymers tend to involve complex production and coating processes. Therefore, cost continues to be a major issue.

The dust suppressant compositions that are currently used comprise a carrier and an active ingredient. A common carrier in dust suppressants used in mining and transport applications is water and the active ingredient is typically calcium chloride, magnesium chloride, surfactants, and humectants. While water is typically benign, the use of calcium and magnesium salts introduce chloride into natural water ways and thus limits their use. Surfactants are often ethoxylated alkyl phenols and anionic surfactants such as sodium lauryl sulfate. The use of ethoxylated alkyl phenols is problematic due to their decomposition into acutely toxic compounds such as nonyl phenol which are hazardous to both human and aquatic life. Typical humectants are compounds such as poly(ethylene glycol) and are often considered non-hazardous. While these materials have been used for years, a more environmentally friendly composition that is also more effective at suppressing dust is still desired.

Accordingly, there is a need for compositions which are useful in suppressing dust and in methods for applying such compositions.

SUMMARY OF THE INVENTION

Embodiments of the invention are directed to compositions and processes for dust suppression (dust suppressant compositions).

In one aspect of the invention, a composition is provided, the composition including a non-sulfonated lignin and an alkylene glycol alkyl ether solvent. The composition may further include an additional solvent, a surfactant, a polymer, a foaming/wetting agent, or a combination thereof.

In another aspect of the invention, a method is provided for applying a composition including providing a composition including a non-sulfonated lignin and an alkylene glycol alkyl ether solvent, providing a substrate having an exposed surface, and applying the composition to the exposed surface of the substrate. The composition may further include a second solvent, a polymer, or a combination thereof.

DETAILED DESCRIPTION OF THE INVENTION

The present invention provides compositions that are useful in imparting dust suppression to substrates, such as dust sources, processes for forming the compositions, and processes for applying the compositions. Dust, also referred to as fugitive dust, is known in the respective industries, and is further defined herein as particles that may be lifted into the air by man-made and natural activities, such as the movement of soil (fields), vehicles, equipment, blasting, and the wind, and does not include emission from definable point sources, such as industrial smoke stacks. The fugitive dust sources may be silica or proppant material dust sources among others. Dust may also be referred to as particles or particulate matter.

In one aspect of the invention, a composition is provided, the composition including a non-sulfonated lignin and an alkylene glycol alkyl ether solvent. The composition may further include a second solvent, a polymer, or a combination thereof.

A non-sulfonated lignin is a lignin material that is free of sulfonate ($SO_3H$) groups.

Lignin is a heterogeneous biopolymer which binds cellulose and hemicellulose together to help provide structural rigidity to plants. Chemically, lignin is a cross-linked phenolic polymer. The lignols that crosslink are of three main types, all derived from phenylpropane: 4-hydroxy-3-methoxyphenylpropane, 3,5-dimethoxy-4-hydroxyphenylpropane, and 4-hydroxyphenylpropane. Compositions vary, and lignins are cross-linked phenolic polymers with a weight average molecular weight range between 500 to 20,000 grams/mole. However, lignin is accepted as a specific material having an identifiable chemical structure to one of ordinary skill in the art and having the Chemical Abstracts Service (CAS) registry number, a division of the American Chemical Society, of CAS number 9005-53-2. Lignin is insoluble in water solvent having a neutral pH.

There are different types of lignin based on the process for separating lignin during the pulping process. One example is Kraft lignin, which is defined herein as lignin obtained via the Kraft process. The Kraft process is a process which treats wood chips with a hot mixture of water, sodium hydroxide, and sodium sulfide which breaks the bonds that link lignin, hemicellulose, and cellulose. This process produces a waste product known as black liquor. Black liquor is primarily a mixture of lignin, hemicellulose, and excess sodium hydroxide and sodium sulfide. Lignin is then separated from the black liquor.

Suitable types of non-sulfonated lignins include Kraft lignin (lignin obtained via the kraft process), pyrolytic lignins (lignin obtained via the pyrolysis process), steam explosion lignin (lignin obtained via the use of steam under high pressure), organosolv lignins (lignin obtained via the organosolv process), soda-ash lignins, dilute acid lignin (lignin obtained via treatment with dilute acids), biorefinery lignins (lignin obtained from any non-pulping process which converts biomass to other chemicals), and combinations thereof.

In contrast, sulfonated lignin is a derivative of lignin material having sulfonate ($SO_3H$) groups from the sulfite pulping process, and is referred to as lignosulfonate, with the Chemical Abstracts Service (CAS) registry number, a division of the American Chemical Society, of CAS number 8062-15-5. Lignosulfonate is observed to have water solubility in water solvent having a neutral pH. Lignosulfonate may also be a neutralized material by reaction with a metal hydroxide, such as sodium hydroxide or calcium hydroxide.

The non-sulfonated lignin, such as Kraft lignin, may be in the range of from about 10 to about 70 weight percent of the composition. Any and all weight percent ranges between about 10 and about 70 weight percent are included herein and disclosed herein; for example, the non-sulfonated lignin may be present in the composition in the range of from about 30 to about 60 weight, from about 35 to about 55 weight percent, or from about 40 to about 50 weight percent.

The composition also contains at least an alkylene glycol alkyl ether solvent. The alkylene glycol alkyl ether solvent may be selected from the group consisting of polyethylene glycol alkyl ethers, polypropylene glycol alkyl ethers, and combinations thereof. Suitable polyethylene glycol alkyl ethers can be represented by R—$(CH_2CH_2O)_n$—R', where R and R' is hydrogen or an C1-C12 alkyl or alkene containing group, with n=1 to 12. Suitable polypropylene glycol alkyl ethers can be represented by R—$(CHCH_3CH_2O)_n$—R', where R and R' is hydrogen or an C1-C12 alkyl or alkene containing group, with n=1 to 12. Suitable glycol ethers can also include random or block co-polymers derived from ethylene oxide and propylene oxide.

Examples of polyethylene glycol alkyl ethers include, but are not limited to diethylene glycol methyl ether, diethylene glycol ethyl ether, diethylene glycol propyl ether, diethylene glycol butyl ether, diethylene glycol pentyl ether, diethylene glycol hexyl ether; ethylene glycol methyl ether, ethylene glycol ethyl ether, ethylene glycol propyl ether, ethylene glycol butyl ether, ethylene glycol pentyl ether, ethylene glycol hexyl ether, ethylene glycol phenyl ether; triethylene glycol methyl ether, triethylene glycol ethyl ether, triethylene glycol propyl ether, triethylene glycol butyl ether, triethylene glycol pentyl ether, triethylene glycol hexyl ether, triethylene glycol heptyl ether, propylene glycol methyl ether, propylene glycol ethyl ether, propylene glycol propyl ether, propylene glycol butyl ether, propylene glycol pentyl ether; dipropylene glycol methyl ether, dipropylene glycol ethyl ether, dipropylene glycol propyl ether, dipropylene glycol butyl ether, dipropylene glycol pentyl ether; tripropylene glycol methyl ether, tripropylene glycol ethyl ether, tripropylene glycol propyl ether, tripropylene glycol butyl ether, tripropylene glycol pentyl ether, and combinations thereof.

The alkylene glycol alkyl ether solvent may be present in the range of from about 30 to about 90 weight percent of the composition. Any and all weight percent ranges between about 30 and about 90 weight percent are included herein and disclosed herein; for example, the alkylene glycol alkyl ether solvent may be present in the composition in the range of from about 40 to about 70 weight percent, from about 45 to about 65 weight percent, or from about 50 to about 60 weight percent.

Optionally, additional solvents other than the alkylene glycol alkyl ether solvent may be present in the composition. Additional solvents may be water, non-alkylene glycol alkyl ether polar aprotic organic solvents, and combinations thereof. Examples of suitable polar aprotic organic solvents include dimethylformamide (DMF), diethylformamide (DEF), dipropylformamide, dimethylsulide oxide (DMSO), dioxane, dichloromethane, ethanol, n-methylpyrrolidone, tetrahydrofuran (THF), acetone, acetonitrile, propylene carbonate and combinations thereof.

If present, greater than 0 weight percent, the additional solvents may be present in the range of from about 0.1 to about 40 weight percent of the composition. Any and all weight percent ranges between 1 and 30 weight percent are included herein and disclosed herein; for example, the additional solvents may be present in the composition in the range of from about 1 to about 20 weight percent, or from about 10 to about 40 weight percent.

The alkylene glycol alkyl ether solvent and the additional solvents may be provided as solvent system having an alkylene glycol alkyl ether solvent to additional solvents ratio from about 10:1 to about 2:8, such as from about 5:1 to about 3:7, for example, 4:1.

The solvent or solvent system of this invention may include a Hildebrandt Solubility Parameter in the range of 27.5 $MPa^{0.5}$ with Hansen Solubility Parameters in the range of 16.0 $MPa^{0.5}$ for the Dispersive component; 12.5 $MPa^{0.5}$ for the Polar component and 18.6 $MPa^{0.5}$ for the Hydrogen bonding component. Typical Hildebrandt Solubility Parameter will be in the range of 25-30 $MPa^{0.5}$ with Hansen Solubility Parameters in the range of 13-19 $MPa^{0.5}$ for the Dispersive component; 10-16 $MPa^{0.5}$ for the Polar component and 16-22 $MPa^{0.5}$ for the Hydrogen bonding component.

Preferred solvent or solvent system properties include a surface tension below 50 mN/m, such as from about 20 mN/m to about 70 mN/m, and viscosity below 50 cP at room temperature (20° C.), such as from about 0.5 cP to about 15 cP.

Optionally, surfactants may be added to the composition. Surfactants, which may also function as wetting agents or foaming agents, can be used at concentrations below 0.1 wt. %, such as from about 10 ppm wt. % to about 1,000 ppm of the composition. Categories of suitable surfactants include anionic surfactants, cationic surfactants, nonionic surfactants, amphoteric surfactants and combinations thereof. Examples of suitable surfactants include anionic sulphosuccinates or non-ionic alcohol ethoxylates, among others.

Optionally, a polymer, such as a non-lignin polymer, may be present in the composition. The polymer may be a non-lignin polymer, which may be selected from the group of polyvinyls, polyethylene, polyacetates, polyamids, alkyd resins, polyesters, phenolic based resins, and combinations thereof. Examples of suitable polymers, which may be non-lignin polymers, include polyvinyl chloride, polyethylene terephthalate (PET), ethylene vinyl acetate (EVA), polyvinyl butyral (PVB), and combinations thereof.

If present, the polymers may be present in the range of from about 0.01 to about 10 weight percent of the composition. Any and all weight percent ranges between 0.01 and 10 weight percent are included herein and disclosed herein; for example, the polymer may be present in the composition in the range of from about 0.01 to about 1 weight percent, from about 0.1 to about 5 weight percent, or from about 1 to about 10 weight percent.

The dust suppressant composition may be applied to a substrate in any suitable technique. Examples include, but are not limited to a spraying technique, a misting technique, a pouring technique, and combinations thereof. The composition may be disposed on the substrate, and may be applied to be continuously or semi-continuously disposed on the substrate. The composition may be applied to one or more substrates, such as for sand or proppants in a commercial or laboratory container.

The dust suppressant composition can then be applied to any substrate which is a dust source. Examples of substrates include, but are not limited to sand, proppants, coal, harvested and non-harvested agricultural crops, fields, charcoal, fertilizer, mined materials, surface mines, roads and road surfaces, paving surfaces, mining waste dumps, mining, manufacturing waste dumps, stock piles, metal ore, metal dust, excavation operations, quarries, construction, material transported on conveyor belts, sand mines, sand transloads, proppant transloads, sand storage, proppant storage, earth moving operations, cements, open railcar loads, rail car toppings, open truck loads, environmental remediation, quarries, mining waste, wind erosion protection, agriculture product control, soil, and combinations thereof.

When applied, the composition may be present in the range of from about 0.01 to about 10 weight percent of the composition and substrate total weight. Any and all weight percent ranges between 0.01 and 10 weight percent are included herein and disclosed herein; for example, the composition may be present in the composition and substrate in the range of from about 0.01 to about 0.1 weight percent, from about 0.05 to about 1 weight percent, or from about 0.1 to about 10 weight percent.

Alternatively, the composition may be applied to provide from about 50 square feet to about 5,000 square feet, for example from about 50 square feet to about 500 square feet or from about 500 square feet to about 5,000 square feet, of surface coverage per gallon of liquid composition applied respectively. After application the compositions described herein may be dried or otherwise treated for effective application to the substrate.

In practice, the dust control process can be as follows. The product is deposited on the substrate. The deposition process may be manual or automatic. The manual or automatic processes may be performed by any known in the art, such as spraying, misting, pouring, or other similar means. The substrate may be individual, such as a road, or in numerous quantities of substrates, such as a grouping of particles.

The product can be applied to a flat or curved surface, such as a road or stock pile, in a manual operation by a person carrying a special container equipped with spray nozzle, similar to weed killer application. The product can also be applied from a motorized vehicle equipped with liquid tank, pump system and spray boom with nozzles, driving over the surface at a fixed speed and a fixed liquid pump rate to ensure even application. Alternatively, the product can be coated on particular material such as sand, by applying the product as a fine mist into an open shoot with gravity fed sand or the mist can be contacted with sand in an enclosed pneumatic transfer system.

In order to provide a better understanding of the present invention including representative advantages thereof, the following examples are offered.

EXAMPLES

In order that those skilled in the art may more fully understand the invention presented herein, the following procedures and examples are set forth. Unless otherwise indicated, the following units of measurement and definitions apply in this application: all parts and percentages are by weight; temperatures are in degrees centigrade (° C.); and readings of vacuum are in inches of mercury.

For the following examples, the data was derived in accordance with the following procedures Dust suppression testing: A simple dust meter setup was used including a vertical shaft having an upper intake funnel and a bottom receiver to collect the falling dust. A dust meter was disposed along the shaft between the intake funnel and the receiver. The dust sample was placed into the intake funnel to drop into the receiver. Both the dust generated in the path from the funnel to the receiver and the dust from the rebounce of the receiver were siphoned into the dust meter (DustTrak, TSI Precision Measurement) and measured. The instrument read the dust amount (mg) over a 1 minute period at a 1 second interval, and the average and maximum amounts are presented. The average amount is used as the indication of performance. The siphon flow rate was 0.75 L/min unless indicated otherwise.

The instrument was first zeroed with the top valve closed before each sample is measured. This takes one minute. After the instrument is zeroed, a dust sample is added to the top funnel, then measurement is started. At ten seconds, the top valve is opened and the dust sample drops from the funnel, and the valve is closed immediately (open to maximum, and close instantly). Data was recorded by the dust meter.

Example 1: Raw Sand (Control)

100 grams of raw sand (what product from who?) was added to a 250 mL vessel, and the contents of the vessel were manually blended for 3 minutes. 1.5 grams of this sample was weighed for each dust. For each sample, three or four samples were prepared to ensure accuracy.

Example 2: Dust Suppressing Performance at 0.1% Level 6.0 grams of diethylene glycol methyl ether (what product from who?) was added to 4.0 grams of Kraft lignin (what product from who?) in a 20 mL glass vial. The vial was then sonicated for 2 hours, or until all solids were dissolved to yield the dust suppressant.

100 grams of raw sand was added to a 250 mL vessel. 0.1 grams of the dust suppressant was then added to the vessel and the contents of the vessel were manually blended for 3 minutes. 1.5 grams of this sample was weighed for each dust. For each sample, three or four samples were prepared to ensure accuracy.

Example 3: Comparison with Sentinel Dust Suppressant 10 grams of Sentinel Dust Suppressant from Hexion dust suppressant was added to a 20 mL glass vial. The vial was then sonicated for 2 hours, or until all solids were dissolved to yield the dust suppressant.

100 grams of raw sand was added to a 250 mL vessel. 0.1 grams of the dust suppressant was then added to the vessel and the contents of the vessel were manually blended for 3 minutes. 1.5 grams of this sample was weighed for each dust. For each sample, three or four samples were prepared to ensure accuracy.

The coated samples and the raw sand sample were measured in the instrument following the aforementioned procedure for the dust level. The data is shown in Table 1 below.

TABLE 1

| Sample | Coating (1%) | Solvent | Dust Level (µg) |
|---|---|---|---|
| Example 1 | None | None | 630 |
| Example 2 | Kraft lignin | diethylene glycol methyl ether | 12 |
| Example 3 | Sentinel | None | 18 |

Table 1 shows comparative results from performance tests involving Hexion's existing commercial dust suppressant with the product of this invention. It was found that the new product has similar or better performance compared to the existing product. Results shows that the new product could have new advantages, considering cost as well as sustainability.

Examples 4-7: Lignin Concentrations 6.0 grams of diethylene glycol methyl ether was added to 4.0 grams of Kraft lignin in a 20 mL glass vial. The vial was then sonicated for 2 hours, or until all solids were dissolved to yield a dust suppressant with 40% (wt %?) Kraft lignin (Example 4). In the same manner, dust suppressant samples with 45% (Example 5), 50% (Example 6), and 55% Kraft lignin (Example 7) were prepared.

100 grams of raw sand was added to a 250 mL vessel. 0.1 grams of the dust suppressant was then added to the vessel and the contents of the vessel were manually blended for 3 minutes. 1.5 grams of this sample was weighed for each dust. For each sample, three or four samples were prepared to ensure accuracy. The samples and the raw sand sample were measured in the instrument following the aforementioned procedure for the dust level. The effect of Kraft lignin (kl) concentration on performance at 0.1% coating level data is shown in Table 2 below.

TABLE 2

| Sample | Coating (1%) | Kraft Lignin Amount | Dust Level (µg) |
|---|---|---|---|
| Example 4 | Kraft lignin | 40% | 12 |
| Example 5 | Kraft lignin | 45% | 19 |
| Example 6 | Kraft lignin | 50% | 14 |
| Example 7 | Kraft lignin | 55% | 26 |
| Example 3 | Sentinel | 0% | 18 |

The results in Table 2 shows that the performance of the product is not very sensitive for the concentration from which it was applied, within the practical variation range, but negative impact is noted at concentrations above 50% where the product's ability to disperse is limited with increased viscosity of the solution. Most applications are expected to require Kraft lignin concentrations below 50% for best performance.

Examples 8-10 Comparison of Coating Amounts 6.0 grams of diethylene glycol methyl ether was added to 4.0 grams of Kraft lignin in a 20 mL glass vial. The vial was then sonicated for 2 hours, or until all solids were dissolved to yield the dust suppressant.

100 grams of raw sand was added to a 250 mL vessel. 0.1 grams of the dust suppressant was then added to the vessel and the contents of the vessel were manually blended for 3 minutes. Another sample was prepared in the same manner, but with 0.05 grams of the dust suppressant. 1.5 grams of each sample were weighed. For each sample, triplet to quintuplet was done to ensure accuracy. Raw sand was also prepared in the same manner in Example 1 and was used for comparison. The samples and the raw sand sample were measured in the instrument following the aforementioned procedure for the dust level. The effect of the amount of Kraft lignin on performance at different coating levels is shown in Table 3 below.

TABLE 3

| Sample | Coating Amount | Kraft Lignin Amount | Dust Level (µg) |
|---|---|---|---|
| Example 8 | 0.1 wt. % Kraft lignin | 40% | 12 |
| Example 9 | 0.05 wt. % Kraft lignin | 40% | 26.8 |
| Example 1 | 0 wt. % Kraft lignin (Raw Sand) | 0% | 630 |

Table 3 shows performance data at different application concentrations. It was noted that the product show significant performance at levels as low as 0.05%, compared to an untreated control sample. It was also noted that the dust suppression performance is more than doubled, at double the treatment level.

Example 10: Pneumatic Movement

Durability of the coating layer against the pneumatic operation involved in sand processes and transportation is a major concern regarding the performance of a dust suppressant. To assess this property, the coated sand sample prepared by the same procedure as in Example 2 was packed into a glass jar, and the jar was turned upside down 10 times. The resulting sample was then evaluated for its dust level, and the data was compared with the original data obtained without the sample being turned upside down. The effect of pneumatic movement on the dust level of coated sand results are shown in Table 4 below.

TABLE 4

| Sample | Coating Amount | Kraft Lignin Amount | Dust Level (µg) before Pneumatic movement | Dust Level (µg) after Pneumatic movement |
|---|---|---|---|---|
| Example 10 | 0.1 wt. % Kraft lignin | 40% | 30 | 25 |
| Example 11 | 0.1 wt. % Sentinel | 0% | 30 | 27 |

Table 4 shows results from test to evaluate the persistence of the coating. The coated sand is subjected to pneumatic movement where the coating can be erased or compromised by frictions and physical impact. The results shows that the treated sand retain its dust inhibition properties, compared to a control sample and compares well with performance of existing commercial Sentinel Dust Suppressant.

While the present invention has been described and illustrated by reference to particular embodiments and examples, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for applying a composition, comprising:
   providing a composition, comprising:
      from 10 weight percent to 70 weight percent a non-sulfonated lignin selected from the group consisting of Kraft lignin, pyrolytic lignins, steam explosion lignin, organosolv lignins, soda-ash lignins, dilute acid lignin, biorefinery lignins, and combinations thereof; and
      from 30 weight percent to 90 weight percent an alkylene glycol alkyl ether solvent, wherein the total amount of all components of the composition is 100 wt. % of the composition;
   providing a substrate having an exposed surface; and
   applying the composition to the exposed surface of the substrate.

2. The method of claim 1, wherein the substrate is a dust source selected from the group consisting of sand, oilfield proppants, coal, paving and road surfaces, stock piles, metal ore, metal dust, mining, excavation operations, quarries, rail car toppings, construction, material transported on conveyor belts, fertilizer, soil, harvested and non-harvested agricultural crops, fields, charcoal, and combinations thereof.

3. The method of claim 1, wherein the applying the composition comprises a spraying technique, a misting technique, a pouring technique, and combinations thereof.

4. The method of claim 1, wherein the composition comprises:
   from 30 weight percent to 60 weight percent of the non-sulfonated lignin; and
   from 40 weight percent to 70 weight percent of the alkylene glycol alkyl ether solvent.

5. The method of claim 1, wherein
   the non-sulfonated lignin comprises Kraft lignin; and
   the alkylene glycol alkyl ether solvent is selected from the group consisting of polyethylene glycol alkyl ethers, polypropylene glycol alkyl ethers and mixtures thereof.

6. The method of claim 1, wherein the solvent is selected from the group consisting of diethylene glycol methyl ether, diethylene glycol ethyl ether, diethylene glycol propyl ether, diethylene glycol butyl ether, diethylene glycol pentyl ether, diethylene glycol hexyl ether; ethylene glycol methyl ether, ethylene glycol ethyl ether, ethylene glycol propyl ether, ethylene glycol butyl ether, ethylene glycol pentyl ether, ethylene glycol hexyl ether, ethylene glycol phenyl ether; triethylene glycol methyl ether, triethylene glycol ethyl ether, triethylene glycol propyl ether, triethylene glycol butyl ether, triethylene glycol pentyl ether, triethylene glycol hexyl ether, and triethylene glycol heptyl ether, propylene glycol methyl ether, propylene glycol ethyl ether, propylene glycol propyl ether, propylene glycol butyl ether, propylene glycol pentyl ether; dipropylene glycol methyl ether, dipropylene glycol ethyl ether, dipropylene glycol propyl ether, dipropylene glycol butyl ether, dipropylene glycol pentyl ether; tripropylene glycol methyl ether, tripropylene glycol ethyl ether, tripropylene glycol propyl ether, tripropylene glycol butyl ether, and tripropylene glycol pentyl ether, and mixtures thereof.

7. The method of claim 5, wherein the composition comprises:
   from 30 wt. % to 60 wt. % of Kraft lignin; and
   from 40 wt. % to 70 wt. % alkylene glycol alkyl ether solvent selected from the group consisting of polyethylene glycol alkyl ethers, polypropylene glycol alkyl ethers and mixtures thereof, wherein the total amount of all components of the composition is 100 wt. % of the composition.

8. The method of claim 1, wherein the solvent is selected from the group consisting of polyethylene glycol alkyl ethers, polypropylene glycol alkyl ethers and mixtures thereof.

9. The method of claim 1, wherein the composition further comprises an additional solvent, a surfactant, a polymer, a foaming/wetting agent, and combinations thereof.

10. The method of claim 9, further comprising an additional solvent selected from the group consisting of dimethylformamide, diethylformamide, dipropylformamide, dimethylsulfoxide, dioxane, dichloromethane, ethanol, n-methylpyrrolidone, tetrahydrofuran, acetone, acetonitrile, propylene carbonate, and combinations thereof.

11. The method of claim 9, further comprising a polymer selected from the group consisting of polyvinyl chloride, polyethylene terephthalate, ethylene vinyl acetate, polyvinyl butyral (PVB), and combinations thereof.

12. The method of claim 9, further comprising a foaming/wetting agent selected from the group consisting of anionic surfactants, cationic surfactants, nonionic surfactants, amphoteric surfactants and combinations thereof.

* * * * *